United States Patent [19]

Preston

[11] Patent Number: 4,986,777

[45] Date of Patent: Jan. 22, 1991

[54] MARINE ENGINE OIL DRAINAGE DEVICE

[76] Inventor: Donald G. Preston, 1318 Hermana Ct., Vista, Calif. 92084

[21] Appl. No.: 427,719

[22] Filed: Oct. 27, 1989

Related U.S. Application Data

[63] Continuation-in-part of Ser. No. 266,015, Nov. 2, 1988, abandoned.

[51] Int. Cl.5 .............................................. B63H 21/10
[52] U.S. Cl. ........................................ 440/88; 184/1.5; 114/197
[58] Field of Search .................... 440/88, 900, 113; 114/197, 198, 270; 184/1.5; 137/351, 587, 588

[56] References Cited

U.S. PATENT DOCUMENTS

| | | | |
|---|---|---|---|
| 1,957,736 | 5/1934 | Strehler | 137/351 |
| 2,571,932 | 10/1951 | Olsson | 114/183 |
| 3,727,638 | 4/1973 | Zaremba, Jr. | 184/1.5 |
| 3,806,085 | 4/1974 | Codo | 137/351 |
| 3,967,697 | 7/1976 | Guenther | 184/1.5 |
| 4,101,000 | 7/1978 | Scully | 184/1.5 |
| 4,714,138 | 12/1987 | Zaccone | 184/1.5 |

Primary Examiner—Joseph F. Peters, Jr.
Assistant Examiner—Edwin L. Swinehart
Attorney, Agent, or Firm—Denton L. Anderson

[57] ABSTRACT

A marine engine oil drainage device and combination are provided for gravitating oil from the oil pan of an inboard marine engine. The discharge device includes a tubular casing which is snugly disposed within the drainage port in the stern of the vessel. The casing is hollow and has an exterior and an interior. The walls of the casing have drainage openings for allowing water in the bottom of the vessel to drain into the casing and out of the vessel via the drainage port. Within the casing is a short nipple affixed to the casing wall opposite the discharge port. The nipple is in fluid communication with an oil drain conduit which runs from the oil pan and connects with the exterior of the casing. In one embodiment, an internal valve is disposed within the casing which can be actuated by a special tool which is thrust into the discharge end of the casing.

19 Claims, 3 Drawing Sheets

MARINE ENGINE OIL DRAINAGE DEVICE

RELATED APPLICATION

This is a continuation-in-part of application Ser. No. 07/266,015, filed Nov. 2, 1988, now abandoned.

BACKGROUND

This invention relates generally to marine inboard engines, and specifically to devices and methods for draining the oil from a marine inboard engine.

Draining the oil from a marine inboard engine has always been a difficult task. In most vessels, an inboard engine is located below decks in an engine compartment barely larger than the engine itself. Draining the oil from an inboard engine requires the difficult tasks of maneuvering in very cramped quarters to get beneath the engine, maneuvering a receptacle below the oil pan plug, removing the plug to drain the oil and replacing the plug thereafter, and removing the waste oil receptacle from beneath the engine and out of the engine compartment.

Several attempts have been made to devise a way to drain the oil from an inboard marine engine via permanent piping running from the oil pan. Most of these prior art attempts have required the use of expensive and maintenance-intensive pumps or other mechanical means with which to pump the drained oil out of the hold of the vessel.

There is therefore a need for a device and a method for draining the oil from a marine inboard engine without having to carry it out or pump it out.

SUMMARY

The invention satisfies this need. The invention is a marine drainage device comprising (a) a hollow casing having an exterior and an interior, the walls of the casing defining a tubular, open-ended discharge section and at least one drainage opening disposed in fluid communication with the discharge section and in fluid communication with the open end of the discharge section; and (b) oil drain conduit connection means for connecting in fluid communication a first conduit disposed outside the casing and a second conduit disposed to protrude through the open end of the discharge section and into the interior of the casing.

The invention is also a combination for draining the oil from a marine inboard engine comprising the marine drainage device described above in combination with a valve disposed within the first conduit and wherein the first conduit is affixed in fluid communication with the oil pan of the marine inboard engine.

One embodiment of the marine drainage device of the invention comprises: (a) a hollow casing having two open ends, a discharge section disposed within the interior of the casing in fluid communication with the first of the open ends and an inlet section disposed within the interior of the casing in fluid communication with the second of the open ends, the casing wall between the two open ends defining at least one drainage opening which places the discharge section in fluid communication with the casing exterior; (b) an inner cylinder disposed within the hollow casing having a first open end proximate to the discharge section of the hollow casing and a second open end proximate to the inlet section of the hollow casing, the inner cylinder being disposed within the hollow casing such that the outer wall surface of the inner cylinder at the first open end of the inner cylinder is spaced apart from the interior wall surface of the hollow casing; (c) first sealing means for preventing fluid flow between the interior wall surface of the casing and the exterior wall surface of the inner cylinder; (d) a valve plug movably disposed within the inlet section of the hollow casing such that the valve plug can be alternatively moved from a first valve plug position wherein the valve plug protrudes into the second open end of the inner cylinder and a second valve plug position wherein the valve plug does not protrude into the second open end of the inner cylinder; (e) second sealing means for preventing fluid flow between the valve plug and the interior wall surface of the inner cylinder when the valve plug is in the first valve plug position; and (f) spring means for urging the valve plug to the first valve plug position.

The invention is also a combination for draining the oil from a marine inboard engine comprising: (a) the marine drainage device described immediately above; and (b) an oil discharge tool comprising: (i) a hollow discharge tube having a first open end in fluid communication with a second open end, the first open end of the discharge tool being protruded into the first open end of the hollow cylinder and attached to the first open end of the inner cylinder so that the discharge tool is in fluid communication with the inner cylinder; and (ii) an actuator rod having a free end and an attached end, the actuator rod being affixed within the discharge tube in such a way that the free end is disposed in contact with the valve plug while the valve plug is in the second valve plug position so as to prevent the valve plug from moving to the first valve plug position.

The invention also comprises a method for draining the oil from a marine inboard engine using the above-described combinations.

DRAWINGS

These and other features, aspects and advantages of the present invention will become better understood with reference to the following description, appended claims and accompanying drawings where:

DESCRIPTION

Figure 1:
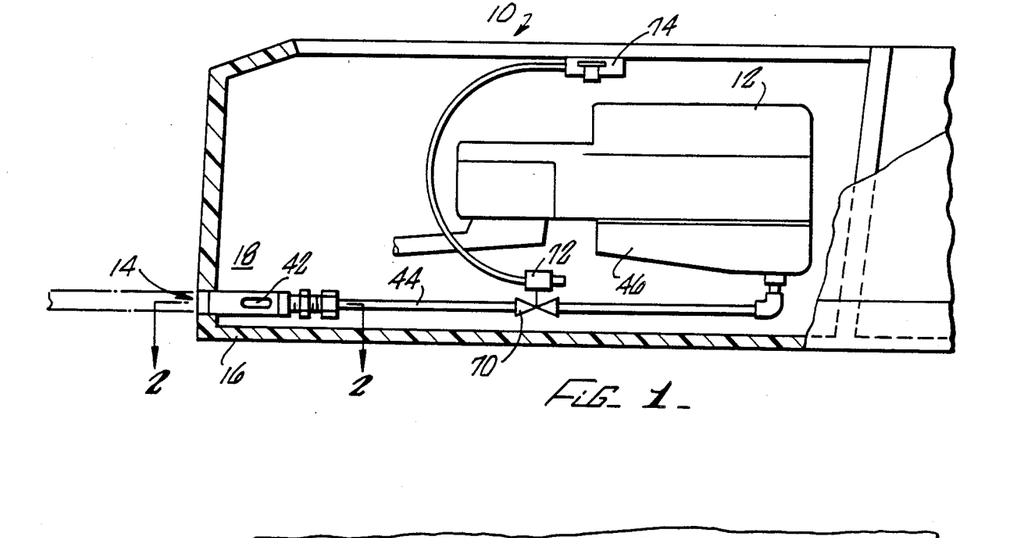
FIG. 1 is a cross-sectional view of the aft portion of a vessel showing a marine drainage device and a combination having features of the invention.
Figure 5:
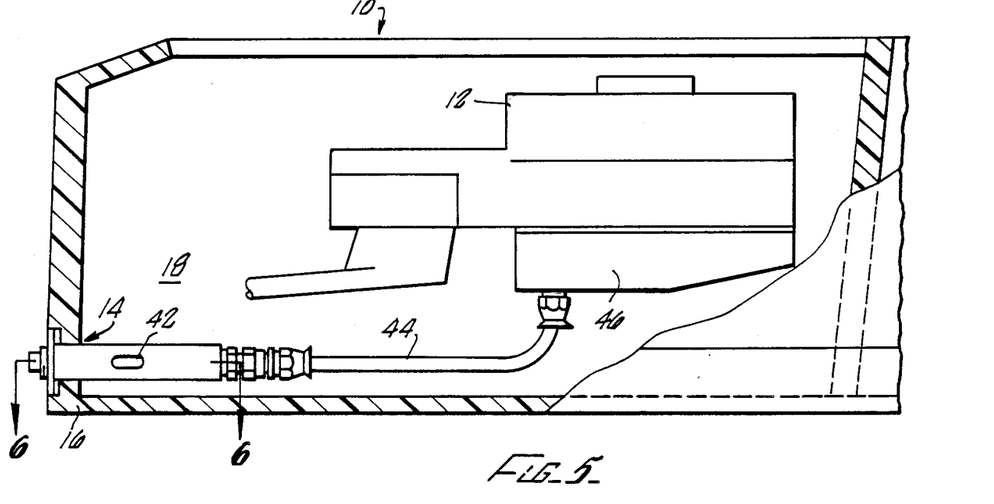
FIG. 5 is a cross-sectional view of the aft portion of a vessel showing a second marine drainage device and a combination having features of the invention.
Figure 6:
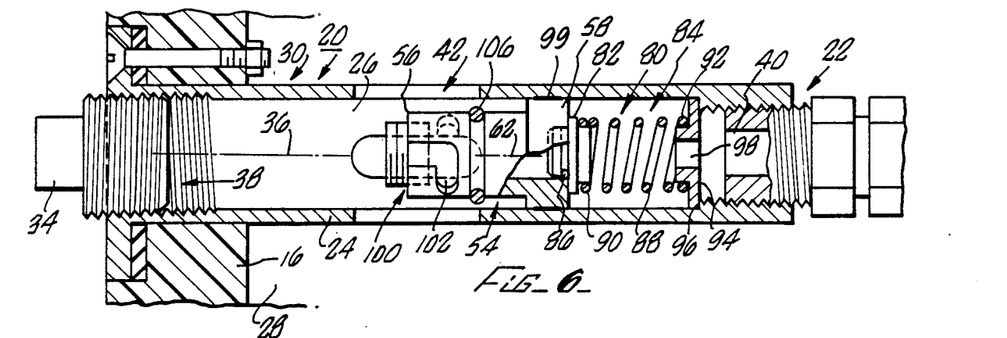
FIG. 6 is a cross-sectional view of the marine drainage device shown in FIG. 5.

With reference to the drawings, FIGS. 1 and 5 shows the aft portion of a typical vessel 10 having a marine inboard engine 12 and a drainage port 14. The drainage port 14 is disposed near the base 16 of the stern of the vessel 10 and is adapted to allow water in the bottom of the vessel 10 to gravitate out of the vessel 10 after the vessel 10 has been taken out of the water.

The marine drainage device of the invention 18 comprises a casing 20 and an oil drain conduit connection means 22.

The casing 20 is hollow. The walls 24 of the casing 20 define a casing interior 26 and a casing exterior 28. The casing 20 may be of any suitable shape so long as the casing 20 defines a tubular discharge section 30 having an external diameter approximately equal to the diameter of the vessel drainage port 14.

The casing 20 illustrated in the drawings is tubular in shape and has a longitudinal axis 36. The casing 20 has a discharge end 38 and an inlet end 40. The discharge end 38 can be internally threaded to accept a male-threaded discharge opening plug 34.

The walls 24 of the casing 20 define one or more drainage openings 42 which place the casing exterior 28 in fluid communication with the discharge section 30 and the open end 32 of the discharge section 30. As so adapted and disposed, the discharge openings 42 allow water to pass from the exterior of the casing 28, through the discharge openings 42, into the discharge section 30 of the casing 20 and then out of the casing 20 via the discharge end 38 of the casing 20. The drainage openings 42 can be of any number and of any suitable size so long as the number and size are not so large as to materially diminish the strength of the casing 20 and so long as they are not so few and so small as to substantially inhibit the flow of water from the exterior 28 of the casing 20 to the interior 26 of the casing 20. Typically, four discharge openings 42 can be cut in the side walls 24 of the casing 20, each opening 42 being approximately 0.25 square inches in area.

The casing 20 can be made out of any suitable material having adequate strength and resistance to corrosive forces existing at the bottom of the vessel 10. The casing 20 can be constructed of brass, copper, aluminum, or stainless steel. The casing 20 can also be made of plastic materials and suitable ceramic and other organic materials. The metal materials are preferable because of the ease with which they can be shaped and machined and because of their high strength-to-weight ratio.

In embodiments of the invention wherein the hollow casing 20 has the shape of a right, circular cylinder, the casing typically has a length between about 5.5 and about 6.5 inches and an external diameter between about one and about 1.3 inches.

The oil drain conduit connection means 22 can be any device suitable for connecting a first conduit 44, which is in fluid communication with the oil pan 46 of the engine 12, to a second conduit 48 which is in fluid communication with the exterior of the vessel 10.

Figures 2, 3:
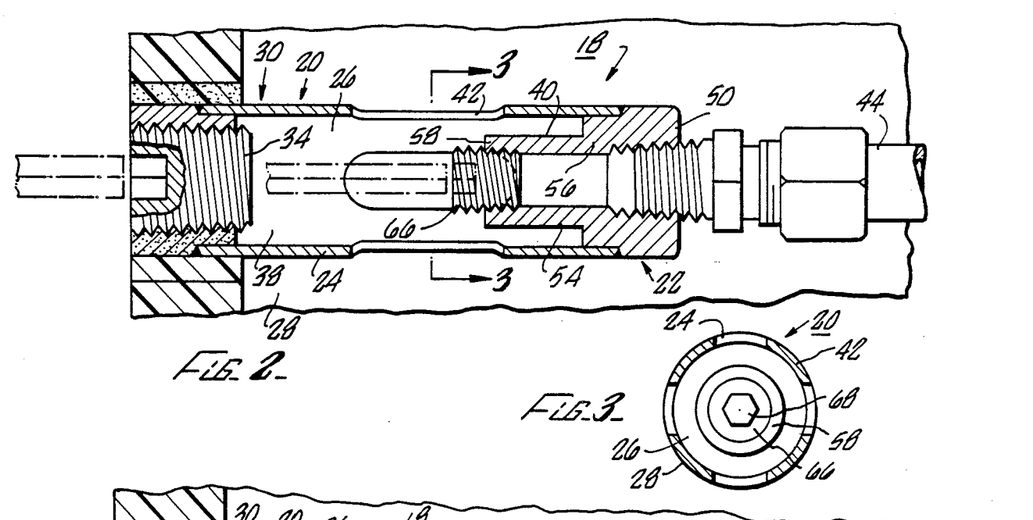
FIG. 2 is a cross-sectional view of the marine drainage device shown in FIG. 1.
FIG. 3 is an end view of the marine drainage device shown in FIG. 1.
Figure 4:
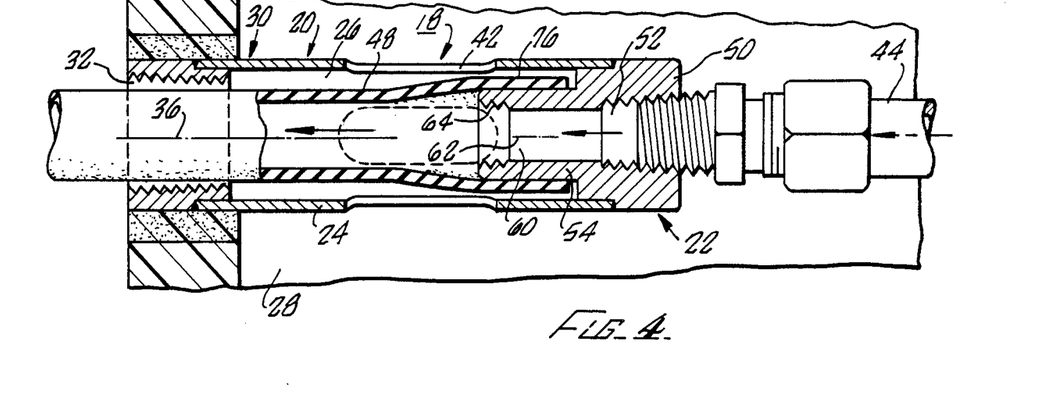
FIG. 4 is a cross-sectional view of the marine drainage device shown in FIG. 1 wherein the marine drainage device is shown in combination with an oil drainage hose.

As shown in FIGS. 2 and 4, the oil drain conduit connection means 22 can be an end cap 50 having a central bore 52 adapted to receive and affix in fluid communication the first conduit 44 and the casing 20.

As shown in FIGS. 1-4, the oil drain conduit connection means 22 can comprise a hollow, inner cylinder 54 having an external diameter which is smaller than the internal diameter of the casing 20 and having a length which is less than that of the casing 20. The inner cylinder 54 has a first end 56 and a second end 58. The second end 58 of the inner cylinder 54 can be affixed in fluid tight fashion to the inside of the end cap 50 in such a way that the end cap 50 completely surrounds the central bore 52, in such a way that the central bore 52 is in fluid communication with the hollow area 60 within the inner cylinder 54, and in such a way that the longitudinal axis 62 of the inner cylinder 54 is substantially parallel with the longitudinal axis 36 of the casing 20. Preferably, the longitudinal axis 62 of the inner cylinder 54 is substantially coincidental with the longitudinal axis 36 of the casing 20.

The first end 56 of the inner cylinder 54 can be adapted with an external diameter which is approximately the same as the internal diameter of the second conduit 48. If the second conduit 48 is constructed of a resilient material such as a plastic or a rubber, the first end 56 of the inner cylinder 54 forms a slip-on fitting over which the second conduit 48 can be snugly affixed, and can be slidably unaffixed. The first end 56 of the inner cylinder 54 is open and in fluid communication with the central bore 52 of the end cap 50. This open first end 56 of the inner cylinder 54 can be adapted with female threads 64 to accept an oil drain plug means which can be a male-threaded cylindrical plug 66. Preferably the oil drain plug 66 is adapted with an allen wrench receptacle opening 68 to allow the oil drain plug 66 to be easily installed and deinstalled.

Typically the inner cylinder 54 has a length between about one and about 1.3 inches and an external diameter between about 0.7 and about 0.9 inches.

As shown in FIGS. 6, 8, 9 and 10, the oil drain conduit connection means 22 can comprise an internal valve 80 which can be operated to open and close the second end 58 of the inner cylinder 54. The internal valve 80 comprises a valve plug 82 and spring means 84.

The valve plug 82 is adapted to fit snugly within the second end 58 of the inner cylinder 54. The valve plug 82 is movably disposed within the inlet end 40 of the hollow casing 20 in such a way that the valve plug 82 can be alternatively moved from a first valve plug position wherein the valve plug 82 protrudes into the second end 58 of the inner cylinder 54 and a second valve plug position wherein the valve plug 82 does not protrude into the second end 58 of the inner cylinder 54. The valve plug 82 comprises valve plug sealing means for preventing fluid flow between the valve plug 82 and the interior wall surface of the inner cylinder 54 when the valve plug 82 is in the first valve plug position. The valve plug sealing means can be an O-ring 86 disposed around the circumference of the valve plug 82. Alternatively, the valve plug sealing means can be an O-ring disposed in a groove within the interior wall surface of the second end 58 of the inner cylinder 54.

The spring means 84 is adapted to urge the valve plug 82 to the first valve plug position. The spring means 84 can be a coiled spring 88 having a first spring end 90 and a second spring end 92, the coiled spring 88 being disposed within the hollow casing inlet end 40 such that the first spring end 90 is in contact with the valve plug 82 on the side of the valve plug 82 opposite the side most proximate to the second open end 58 of the inner cylinder 54.

The spring means 84 can further comprise spring retainer means disposed within the inlet end 40 of the hollow casing 20 opposite the second open end 58 of the inner cylinder 54 in such a way that when the valve plug 82 is in the first valve plug position, the coiled spring 88 is under tension. As illustrated in FIGS. 6, 8, 9 and 10, the spring retainer means can comprise a spring retainer member 94 which is disposed up against an interior lip 96 defined on the inner surface of the hollow casing wall 24 proximate to the inlet end 40 of the casing 20. The spring retainer member 94 is disposed within the inlet end 40 of the hollow casing 20 in contact with the second end 92 of the coiled spring 88 and is held in place by the tension of the coiled spring 88 urging the spring retainer member 94 against the lip 96 defined on the interior surface of the hollow casing wall 24. The spring retainer member 94 has a central bore 98 which allows fluid flow from the inlet end 40 of the hollow casing 20 to the second end 58 of the inner cylinder 54.

The oil drain conduit connection means in the embodiment illustrated in FIGS. 5, 6, 8, 9 and 10 further comprises an inner cylinder sealing means for preventing fluid flow between the interior wall surface of the hollow casing 20 and the exterior wall surface of the inner cylinder 54. In the embodiment illustrated in FIGS. 5, 6, 8, 9 and 10 the inner cylinder sealing means is a weld bead 99 around the circumference of the inner cylinder 54 attaching the inner cylinder 54 to the interior wall surface of the hollow casing 20.

The oil drain conduit connection means 22 of the embodiment illustrated in FIGS. 5, 6, 8, 9 and 10 further comprises connection means 100 for attaching the second conduit 48 to the first end 56 of the inner cylinder 54. Such connection means 100 can comprise pipe threads (not shown) disposed on the exterior surface of the first end 56 of the inner cylinder 54 adapted to receive similar pipe threads (not shown) disposed on the inner surface of the second conduit 48. As illustrated in FIGS. 6, 8, 9 and 10, the connection means 100 can comprise at least one L-shaped groove 102 disposed on the exterior surface of the first end 56 of the inner cylinder 54 and adapted to receive a projection member 104 disposed on the inner surface of an open end 76 of the second conduit 48. The connection means 100 can further comprise sealing means for preventing fluid flow between the outer surface of the first end 56 of the inner cylinder 54 and the inner surface of the open end 76 of the second conduit 48. Such sealing means can comprise an O-ring 106 disposed around the exterior circumference of the first end 56 of the inner cylinder 54.

As in the embodiment illustrated in FIGS. 1–4, the embodiment illustrated in FIGS. 5, 6, 8, 9 and 10 can further comprise (i) a male-threaded discharge opening plug 34 which can alternatively seal and unseal the discharge end 38 of the casing 20 and (ii) a cylindrical plug 66 for alternatively sealing and unsealing the first end 56 of the inner cylinder 54.

Figure 7:
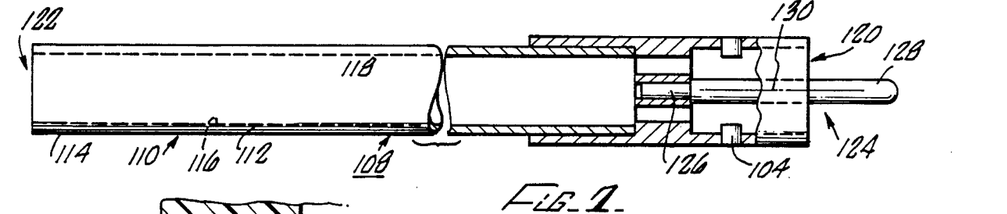
FIG. 7 is a cross-sectional view of an oil discharge tool useful in a combination having features of the invention.

The embodiment of the marine drainage device illustrated in FIGS. 5, 6, 8, 9 and 10 is adapted to be used in combination with an oil discharge tool 108 such as illustrated in FIG. 7. Such oil discharge tool 108 comprises a hollow discharge tube 110 having a wall 112 with an exterior wall surface 114 and an interior wall surface 116, and a longitudinal axis 118. The hollow discharge tube 110 has a first open end 120 and a second open end 122, the two open ends 120 and 122 being in fluid communication with one another. The hollow discharge tube 110 has an exterior diameter which is smaller than the internal diameter of the hollow casing 20. The hollow discharge tube 110 has an inner diameter which is only slightly larger than the exterior diameter of the first end 56 of the inner cylinder 54. By this configuration, the first open end 120 of the oil discharge tool 108 can be protruded into the discharge end 38 of the hollow casing 20 and can be slipped over the first end 56 of the inner cylinder 54. When used in this manner, the oil discharge tool 108 acts as the second conduit 48 to receive oil flowing through the inner cylinder 54 and pass such oil via the hollow discharge tube 110 to the exterior of the vessel 10.

Figure 10:
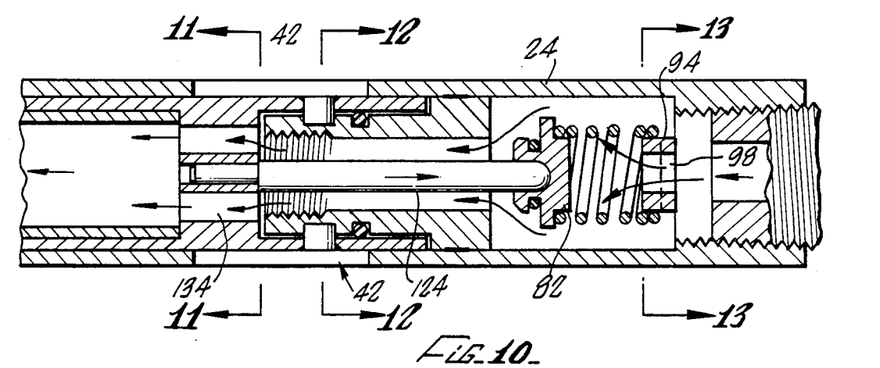
FIG. 10 is a cross-sectional detail of the combination of FIG. 8 along the line 9—9 showing the combination in an oil drain open mode.
Figure 11:
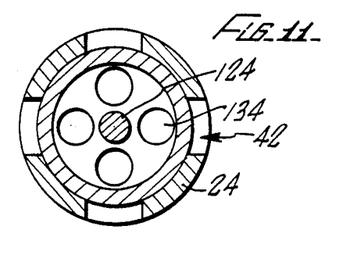
FIG. 11 is a cross-sectional view of the combination of FIG. 8 along the plane 11—11.
Figure 12:
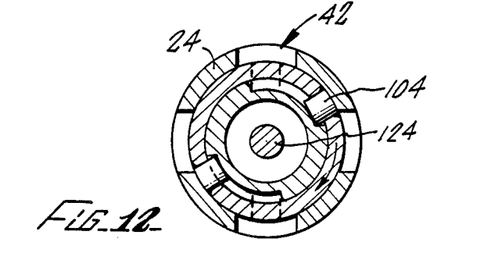
FIG. 12 is a cross-sectional view of the combination of FIG. 8 along the plane 12—12.
Figures 13, 14:
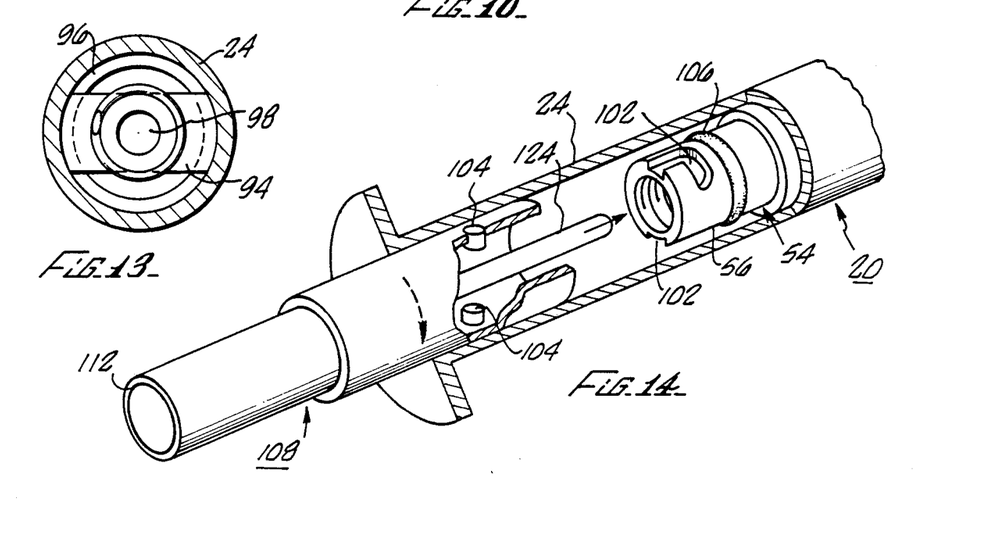
FIG. 13 is a cross-sectional view of the combination of FIG. 8 along the plane 13—13.
FIG. 14 is a perspective view in partial cross-section showing the combination of FIG. 8.

The oil discharge tool 108 further comprises an actuator rod 124 which has a first end 126, a second end 128 and a longitudinal axis 130. As shown in FIG. 10, the first end 126 of the actuator rod 124 is affixed within the hollow discharge tube 110 in such a way, that when the first open end 120 of the hollow discharge tube 110 is attached to the first end 56 of the inner cylinder 54, the second end 128 of the actuator rod 124 is in contact with the valve plug 82 while the valve plug 82 is in the second valve plug position (open position) such that the valve plug is prevented from moving to the first valve plug position (closed position).

The interior wall surface 116 of the first end 120 of the hollow discharge tube 110 can define attachment means adapted to mate with attachment means disposed on the exterior surface of the first end 56 of the inner cylinder 54. In the embodiment illustrated in FIGS. 6–14, such attachment means are the projection members 104 defined on the inner wall surface 116 of the first end 120 of the hollow discharge tube 110 and adapted to mate with the L-shaped grooves 102 disposed within the exterior surface of the first end 56 of the inner cylinder 54.

Optionally, the hollow discharge tube 110 can further comprise an O-ring (not shown) disposed within a groove around the interior circumference of the first open end 120 to supply an additional sealing means to prevent fluid from flowing between the exterior wall of the inner cylinder 54 and the interior wall of the hollow discharge tube 110.

In the embodiment of the oil discharge tool 108 shown in FIGS. 7–12 and 14, the actuator rod 124 is attached within the hollow discharge tube 110 by a perforated solid cylinder 132 affixed to the inner wall surface of the hollow discharge tube 110. Oil discharge tool access bores 134 are defined within the solid cylinder 132 to allow fluid to flow from the first end 120 of the hollow discharge tube 110 to the second end 122 of the hollow discharge tube 110 as illustrated in FIG. 10.

The marine drainage device of the invention 18 is used in combination with the first conduit 44 which is in fluid communication with the oil pan 46 of the marine inboard engine 12. As illustrated in FIG. 1, where the marine drainage device 18 is configured as in FIGS. 1–4, an exterior valve 70 is preferably disposed in fluid communication within the first conduit 44 and is adapted to alternatively open and close the first conduit 44 to fluid flow. Preferably, the valve 70 is disposed proximate to the oil pan 46 to minimize plugging caused by oily solids sitting in the first conduit 44 upstream of the valve 70. Also, it is preferable that the valve 70 be motorized, such as by a solenoid motor 72, and be remotely controlled from a control station 74 conveniently disposed as, for example, on the main deck of the vessel 10. As illustrated in FIG. 5, where the marine drainage device 18 is configured as in FIGS. 5–14, the exterior valve 70 is not necessary because the internal valve 80 performs the same function.

In operation, the marine drainage device 18 is disposed within the vessel 10 such that the tubular discharge section 30 is snugly affixed within the vessel's drainage port 14 and the first conduit 44 is in fluid communication with the oil pan 46 of the marine inboard engine 12.

To drain the oil from the oil pan 46 of the marine inboard engine 12 using the embodiment of the marine drainage device illustrated in FIGS. 1–4, the following steps are followed: Any discharge opening plug 34 disposed within the discharge end 38 of the casing 20 is removed. The cylindrical plug 66 is then removed. The open end 76 of the second conduit 48 is protruded through the drainage port 14, through the discharge end 38 of the casing 20 and into the casing interior 26. The second conduit 48 is then snugly slipped over the slip-on fitting formed by the first end 56 of the inner cylinder 54 (as illustrated in FIG. 4). The opposite end (not shown) of the second conduit 48 is disposed external of the vessel 10 and is in fluid communication with a suitable waste oil receptacle (not shown). The external valve 70 is then caused to be opened, thereby allowing oil to gravitate out of the oil pan 46, through the first conduit 44, through the oil drain conduit connection means 22, into the second conduit 48, and then, via the second conduit 48, out of the vessel 10 and into the waste oil receptacle.

Figure 8:
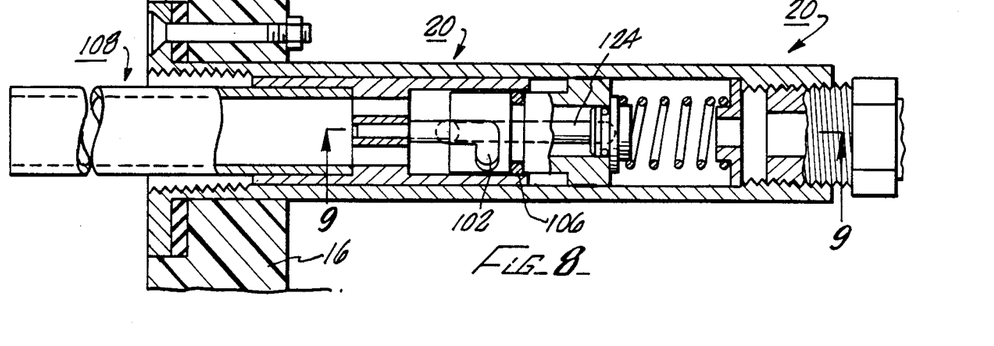
FIG. 8 is a cross-sectional view of the marine discharge device show in FIG. 6 in combination with the oil discharge tool of FIG. 7.
Figure 9:
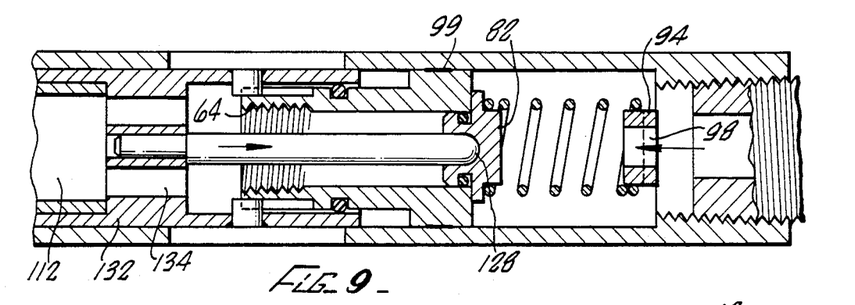
FIG. 9 is a cross-sectional detail of the combination of FIG. 8 along the line 9—9 showing the combination in an oil drain closed mode.

To drain the oil from the oil pan 46 of the marine inboard engine 12 using the embodiment of the marine drainage device illustrated in FIGS. 5–14, the following steps are followed: Any discharge opening plug 34 disposed within the discharge end 38 of the casing 20 is removed. Any cylindrical plug 66 is then removed. The first end 120 of the hollow discharge tube 110 of the oil discharge tool 108 is protruded through the drainage port 14, through the discharge end 38 of the casing 20, and into the casing interior 26. As shown in FIGS. 8 and 9, the first end 120 of the hollow discharge tube 110 is then slipped over the first end 56 of the inner cylinder 54 such that the projection members 104 on the interior surface of the first end 120 of the hollow discharge tube 110 engage and mate with the L-shaped grooves 102 disposed on the outer surface of the first end 56 of the inner cylinder 54. The oil discharge tool 108 is then urged further into the hollow casing 20 (against the tension provided by the coiled spring 88) so that the projection members 104 are moved from the opening 136 of the L-shaped grooves 102 to the turning section 138 of the L-shaped grooves 102. The oil discharge tool 108 is then rotated so that the projection members 104 move to the end of the lateral portion 140 of the L-shaped grooves 102 (furthermost from the opening 136 of the L-shaped grooves 102) as illustrated in FIG. 10.

As the oil discharge tool 108 is thrust into the hollow casing 20, the second end 128 of the actuator rod 124 is caused to contact the valve plug 82 and to push the valve plug 82 (against the tension of the coiled spring 88) from the first valve plug position (closed position) to the second valve plug position (open position). Oil within the first conduit 44 is thereby allowed to flow from the inlet end 40 of the hollow casing 20, pass through the central bore 98 of the spring retainer member 94, around the valve plug 82 into the inner cylinder 54, through the inner cylinder 54 and into the hollow discharge tube 110 of the oil discharge tool 108, through the first end 120 of the hollow discharge tube 110, through the perforated solid cylinder 132 to the second end 122 of the hollow discharge tube 110, out of the vessel 10 and into a suitable waste oil receptacle.

To discharge water accumulated in the bottom of the vessel 10, the vessel 10 is taken out of the water and the discharge opening plug 34 is removed from the discharge end 38 of the casing 20. Water is thereby caused to gravitate from the bottom of the vessel 10, through the drainage openings 42 in the casing walls 24, into the discharge section 30 of the casing 20, through the discharge section 30 and out of the vessel 10 via the discharge end 38 of the casing 20.

Using the device and combination of the invention, the drainage port 14 of the vessel 10 is cleverly used for either of the two functions of draining oil from the marine inboard engine 12 and for draining water from the bottom of the vessel 10. The embodiment of the invention illustrated in FIGS. 6–14 is especially clever because it requires no remote-controllable valve 70 in the oil pan drain conduit 44.

Although preferred embodiments of the present invention have been described in considerable detail, other versions and embodiments of the invention are possible. Therefore, the present invention should not be limited to the preferred embodiments described herein but instead are defined by the spirit and scope of the appended claims.

What is claimed is:

1. A marine drainage device comprising a hollow casing having a casing wall which defines a casing exterior and a casing interior, wherein:
    (a) the casing comprises an open-ended tubular discharge section whose open end provides a first casing opening;
    (b) the casing wall defines a second casing opening for allowing the flow of fluids from the casing exterior to the casing interior;
    (c) the casing wall defines a third casing opening;
    (d) the casing comprises first connection means for connecting the casing with a first conduit which communicates with the casing exterior, such connection being accomplished within the third casing opening in such a way that fluids within the casing interior are prevented from flowing around the first conduit through the third casing opening to the casing exterior; and
    (e) the casing comprises second connection means for connecting the first conduit into fluid communication with a second conduit which is protruded into the casing interior via the first casing opening, such connection being accomplished within the casing interior and in such a way that fluid within the first conduit can flow out of the casing interior via the second conduit but cannot flow out of the casing interior through the second casing opening.

2. The marine drainage device defined in claim 1 wherein the first connection means comprises an inner cylinder having a first end and a second end, the inner cylinder being disposed wholly within the casing with the end of the inner cylinder disposed closest to the tubular discharge section being spaced apart from the casing wall and with the end of the inner cylinder disposed farthest from the tubular discharge section being fluid-tightly affixed to the casing wall.

3. The marine drainage device defined in claim 1 further comprising a first plug means disposed on the interior of the casing and adapted to alternatively seal and unseal one end of the first conduit.

4. The marine drainage device defined in claim 3 wherein the first connection means defines an internally threaded oil drain opening, and wherein the first plug means is an externally threaded plug adapted to snugly screw into the oil drain opening.

5. The marine drainage device defined in claim 1 further comprising a discharge opening plug adapted to snugly fit within the first casing opening so as to alternately seal and unseal the first casing opening.

6. The marine drainage device defined in claim 1 wherein the tubular discharge section is adapted to fit within the drainage port of a vessel.

7. A marine drainage device comprising:
(a) a hollow tubular casing defined by tubular walls and having an exterior and an interior and a longitudinal axis, the tubular walls of the casing defining an open discharge end, an inlet end, and at least one drainage opening disposed in fluid communication with the interior of the casing and in fluid communication with the open discharge end;
(b) an end cap covering the inlet end of the casing, the end cap defining a central bore adapted to receive a first conduit;
(c) an inner cylinder having a first end and a second end, the inner cylinder being disposed wholly within the casing and the first end of the inner cylinder being fluid-tightly affixed to the end cap in such a way that it surrounds the central bore; and
(d) oil drain conduit connection means for connecting in fluid communication the first conduit disposed outside of the casing and the inner cylinder via the central bore.

8. The marine drainage device defined in claim 7 further comprising a plug adapted to alternatively seal and unseal the second end of the inner cylinder.

9. A marine drainage combination comprising the marine drainage device defined in claim 8 wherein a valve is disposed within the first conduit and is adapted to meter flow within the first conduit and wherein the first conduit is affixed in fluid communication to the oil pan of a marine inboard engine.

10. A method for draining the oil from a marine inboard engine installed within a vessel having the marine drainage combination defined in claim 9 snugly affixed within the vessel's drainage port comprising:
(a) removing the plug from the inner cylinder;
(b) protruding one end of a drainage hose from the exterior of the vessel into the open end of the tubular discharge section and snugly affixing the hose to the exterior of the inner cylinder; and
(c) opening the valve to allow oil to serially flow from the oil pan, through the first conduit, through the central bore, through the inner cylinder, into the drainage hose and, via the drainage hose, to the exterior of the vessel.

11. A marine drainage device comprising:
(a) a hollow casing having a length, an external diameter, a longitudinal axis, an exterior, an interior, a casing wall with an exterior wall surface and an interior wall surface, a first open end, a second open end, a discharge section disposed within the interior of the casing in fluid communication with the first open end and an inlet section disposed within the interior of the casing in fluid communication with the second open end, the casing wall between the two open ends defining at least one drainage opening which places the discharge section in fluid communication with the casing exterior;
(b) an inner cylinder disposed within the hollow casing and having a length, an external diameter, a longitudinal axis, an interior wall surface and an exterior wall surface, a first open end proximate to the discharge section of the hollow casing and a second open end proximate to the inlet section of the hollow casing, the inner cylinder being disposed within the hollow casing such that the outer wall surface of the inner cylinder at the first open end of the inner cylinder is spaced apart from the interior wall surface of the hollow casing;
(c) first sealing means for preventing fluid flow between the interior wall surface of the casing and the exterior wall surface of the inner cylinder;
(d) a valve plug movably disposed within the inlet section of the hollow casing such that the valve plug can be alternatively moved from a first valve plug position wherein the valve plug protrudes into the second open end of the inner cylinder and a second valve plug position wherein the valve plug does not protrude into the second open end of the inner cylinder;
(e) second sealing means for preventing fluid flow between the valve plug and the interior wall surface of the inner cylinder when the valve plug is in the first valve plug position; and
(f) spring means for urging the valve plug to the first valve plug position.

12. The marine drainage device of claim 11 wherein the hollow casing has a length between about 5.5 and about 6.5 inches and an external diameter between about one and about 1.3 inches.

13. The marine drainage device of claim 11 wherein the hollow casing and the inner cylinder are both right circular cylinders and the longitudinal axis of the inner cylinder is substantially coincidental with the longitudinal axis of the hollow casing.

14. The marine discharge device of claim 11 wherein the second sealing means is an O-ring disposed around the valve plug.

15. A marine drainage device comprising:
(a) a hollow casing having the shape of a right circular cylinder with a length between about 5.5 and about 6.5 inches, an external diameter between about one and about 1.3 inches, a longitudinal axis, an exterior, an interior, a casing wall with an exterior wall surface and an interior wall surface, a first open end, a second open end, a discharge section disposed within the interior of the casing in fluid communication with the first open end and an inlet section disposed within the interior of the casing in fluid communication with the second open end, the casing wall between the two open ends defining a plurality of drainage openings, each of which places the discharge section in fluid communication with the casing exterior;

(b) an inner cylinder disposed within the casing having the shape of a right circular cylinder with a length between about one and about 1.3 inches, an internal diameter, an external diameter between about 0.7 and about 0.9 inches, a longitudinal axis, a wall with an interior wall surface and an exterior wall surface, a first open end proximate to the discharge section of the hollow casing and a second open end proximate to the inlet section of the hollow casing, the inner cylinder being disposed within the hollow casing such that the outer wall surface of the inner cylinder at the first open end of the inner cylinder is spaced apart from the interior wall surface of the hollow casing and the longitudinal axis of the inner cylinder is substantially coincidental with the longitudinal axis of the hollow casing, the inner cylinder being rigidly affixed within the hollow casing in such a way that fluid is prevented from flowing between the interior wall surface of the casing and the exterior wall surface of the inner cylinder;

(c) an O-ring disposed around the first end of the inner cylinder;

(d) a valve plug movably disposed within the inlet section of the hollow casing such that the valve plug can be alternatively moved from a first valve plug position wherein the valve plug protrudes into the second open end of the inner cylinder and a second valve plug position wherein the valve plug does not protrude into the second open end of the inner cylinder, the valve plug having an external diameter which is slightly smaller than the internal diameter of the second open end of the inner cylinder;

(e) a second O-ring disposed around the valve plug so that when the valve plug is in the second valve plug position, fluid flow is prevented between the valve plug and the interior wall surface of the inner cylinder;

(f) a coiled spring having a first spring end and a second spring end, the spring being disposed within the hollow casing inlet section such that the first spring end is in contact with the valve plug on the side of the valve plug opposite the side most proximate to the second open end of the inner cylinder;

(g) spring retainer means disposed within the hollow casing and in contact with the second spring end such that when the valve plug is in the first valve plug position the spring is under tension;

(h) first connection means for attaching a first conduit disposed exterior to the hollow casing in fluid communication with the inlet section of the hollow casing; and (i) second connection means for attaching a hollow discharge tube in fluid communication with the first open end of the inner cylinder.

16. A combination comprising:
(a) the marine drainage device of claim 11; and
(b) an oil discharge tool comprising:
(i) a hollow discharge tube having a wall with an exterior wall surface and an interior wall surface, a longitudinal axis and a first open end in fluid communication with a second open end, the first open end of the discharge tool being protruded into the first open end of the hollow cylinder and attached to the first open end of the inner cylinder so that the discharge tool is in fluid communication with the inner cylinder; and
(ii) an actuator rod having a first end, a second end, and a longitudinal axis, the first end of the actuator rod being affixed within the discharge tube in such a way that the second end of the actuator rod is disposed in contact with the valve plug while the valve plug is in the second valve plug position so as to prevent the valve plug from moving to the first valve plug position.

17. The combination of claim 16 wherein the interior wall surface of the second end of the discharge tube has a projection member disposed normal to the wall of the discharge tube and wherein the external surface of the first end of the inner cylinder defines at least one L-shaped groove adapted to accept the projection member.

18. The combination of claim 16 wherein the sealing means comprises an O-ring disposed around the first open end of the inner cylinder.

19. A combination comprising:
(a) a marine drainage device comprising:
(i) a hollow casing having the shape of a right circular cylinder with a length between about 5.5 and about 6.5 inches, an external diameter between about one and about 1.3 inches, a longitudinal axis, an exterior, an interior, a casing wall with an exterior wall surface and an interior wall surface, a first open end, a second open end, a discharge section disposed within the interior of the casing in fluid communication with the first open end and an inlet section disposed within the interior of the casing in fluid communication with the second open end, the casing wall between the two open ends defining a plurality of drainage openings, each of which places the discharge section in fluid communication with the casing exterior;
(ii) an inner cylinder disposed within the casing having the shape of a right circular cylinder with a length between about one and about 1.3 inches, an internal diameter, an external diameter between about 0.7 and about 0.9 inches, a longitudinal axis, a wall with an interior wall surface and an exterior wall surface, a first open end proximate to the discharge section of the hollow casing and a second open end proximate to the inlet section of the hollow casing, the inner cylinder being disposed within the hollow casing such that the outer wall surface of the inner cylinder at the first open end of the inner cylinder is spaced apart from the interior wall surface of the hollow casing and the longitudinal axis of the inner cylinder is substantially coincidental with the longitudinal axis of the hollow casing, the inner cylinder being rigidly affixed within the hollow casing in such a way that fluid is prevented from flowing between the interior wall surface of the casing and the exterior wall surface of the inner cylinder;
(iii) an O-ring disposed around the first end of the inner cylinder;
(iv) a valve plug movably disposed within the inlet section of the hollow casing such that the valve plug can be alternatively moved from a first valve plug position wherein the valve plug protrudes into the second open end of the inner cylinder and a second valve plug position wherein the valve plug does not protrude into the second open end of the inner cylinder, the valve plug having an external diameter which is slightly smaller than the internal diameter of the second open end of the inner cylinder;

(v) a second O-ring disposed around the valve plug so that when the valve plug is in the second valve plug position, fluid flow is prevented between the valve plug and the interior wall surface of the inner cylinder;

(vi) a coiled spring having a first spring end and a second spring end, the spring being disposed within the hollow casing inlet section such that the first spring end is in contact with the valve plug on the side of the valve plug opposite the side most proximate to the second open end of the inner cylinder;

(vii) spring retainer means disposed within the hollow casing and in contact with the second spring end such that when the valve plug is in the first valve plug position the spring is under tension;

(viii) first connection means for attaching a first conduit disposed exterior to the hollow casing in fluid communication with the inlet section of the hollow casing; and (ix) second connection means for attaching a hollow discharge tube in fluid communication with the first open end of the inner cylinder; and (b) an open discharge tube comprising:

(i) a hollow discharge tube having a wall with an exterior wall surface and an interior wall surface, a longitudinal axis and a first open end in fluid communication with a second open end, the first open end of the discharge tool being protruded into the first open end of the hollow cylinder and attached to the first open end of the inner cylinder so that the discharge tool is in fluid communication with the inner cylinder; and (ii) an actuator rod having a first end, a second end, and a longitudinal axis, the first end of the actuator rod being affixed within the discharge tube in such a way that the second end of the actuator rod is disposed in contact with the valve plug while the valve plug is in the second valve plug position so as to prevent the valve plug from moving to the first valve plug position.

* * * * *